United States Patent [19]

Mitsuhashi et al.

[11] Patent Number: 4,812,921
[45] Date of Patent: Mar. 14, 1989

[54] SOUND FIELD EXPANSION SYSTEM FOR A VIDEO TAPE RECORDER

[75] Inventors: Takamichi Mitsuhashi, Saitama; Masao Tomioka, Kanagawa, both of Japan

[73] Assignee: Sony Corporation, Tokyo, Japan

[21] Appl. No.: 933,915

[22] Filed: Nov. 24, 1986

[30] Foreign Application Priority Data

Dec. 18, 1985 [JP] Japan .................. 60-285296

[51] Int. Cl.$^4$ .................. H04N 5/782; H04R 5/00
[52] U.S. Cl. .................. 358/343; 369/87; 381/17
[58] Field of Search .................. 358/343; 360/19.1; 369/60, 87, 84, 90; 381/1, 17, 18, 19

[56] References Cited

U.S. PATENT DOCUMENTS

| | | | |
|---|---|---|---|
| 3,845,245 | 10/1974 | Takahashi | 369/89 |
| 4,164,884 | 8/1979 | Kakehashi | 84/1.24 |
| 4,232,190 | 11/1980 | Laiacona | 179/1 B |
| 4,329,544 | 5/1982 | Yamada | 179/1 VE |
| 4,352,954 | 10/1982 | Franssen, deceased et al. | 179/1 J |
| 4,453,186 | 6/1984 | Watatani et al. | 358/330 |
| 4,542,419 | 9/1985 | Morio et al. | 360/19.1 |
| 4,613,912 | 9/1986 | Shibata | 360/19.1 |
| 4,625,326 | 11/1986 | Kitzen et al. | 381/17 |
| 4,642,812 | 2/1987 | Yoshio et al. | 381/1 |

FOREIGN PATENT DOCUMENTS

5394288 6/1983 Japan .

OTHER PUBLICATIONS

Toshiba Owner's Manual, "Video Cassette Recorder", V-S36 (1983).
Copending U.S. patent application Ser. No. 884,351.

Primary Examiner—Donald McElheny, Jr.
Attorney, Agent, or Firm—Ronald P. Kananen

[57] ABSTRACT

A sound field expansion system applicable to a magnetic recording and reproducing apparatus (VTR) which can expand the sound field in a simple construction. In the sound field expansion system, a circuit for virtually forming two comb filter characteristics is provided by adding a first audio signal and a second audio signal delayed by a predetermined interval of time with respect to the first audio signal and adding the first audio signal which is passed through a phase shift circuit which shifts the phase of the first audio signal so that the reproduced sound field can remarkably be expanded. Furthermore, a correction circuit for providing a predetermined frequency characteristic for the first or second audio signal is installed so that an acoustic image having a desired frequency band can be positioned. The first and second audio signals may be monaural or stereophonic and are derived from demodulations of audio frequency-modulated (AFM) signal recorded on a common track of a magnetic tape together with a one-field video signal in a frequency division multiplex mode and time-axis-compressed pulse-code-modulated audio (PCM) signal recorded on the common track together with the one-field video signal in a time share mode.

17 Claims, 4 Drawing Sheets

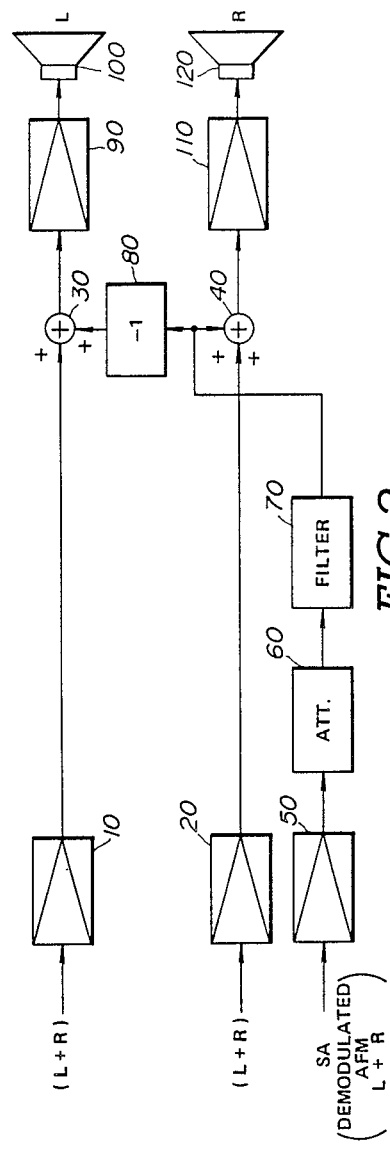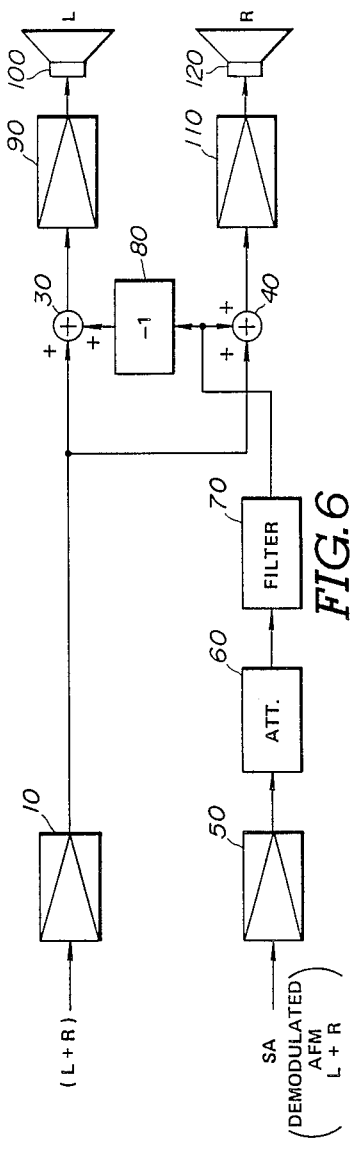

(A)

(B)

SOUND FIELD EXPANSION SYSTEM FOR A VIDEO TAPE RECORDER

BACKGROUND OF THE INVENTION

1. Field of the Invention

The present invention relates to a sound field expansion system. The present invention particularly relates to a sound field expansion system which is applicable to a magnetic recording and reproducing apparatus, such as a video tape recorder (VTR), which plays back a magnetic tape on a common track on which a video signal and a time-axis-compressed Pulse Code Modulation (PCM) audio signal are recorded in a time share mode and on the same track of which an Audio Frequency Modulated (AFM) signal is recorded with the video signal in a frequency division multiplex mode. Still more particularly, the present invention relates to a sound field expansion system which can move or position various accoustic images over a wide sound field.

2. Description of the Prior Art

Conventional magnetic recording and reproducing apparatus, e.g., helical scan type video tape recorders (VTR), have recording tracks which slant across the magnetic tape and record video signals on the common tracks through the use of at least one rotary head. Since the audio signals are recorded by a stationary head, audio tracks lie along the elongated axis of the magnetic tape. In such magnetic recording and reproducing VTR apparatus, the rate of feed of the magnetic tape may be reduced to expand the recording time. But when the tape feed rate is reduced, the quality of the audio signals is also reduced. To improve the quality of the sound, a magnetic tape recording and reproducing apparatus has been developed which records the audio signals in the above-described video tracks by means of one or more rotary heads.

FIG. 1(A) shows an arrangement of a rotary drum and magnetic tape in the magnetic recording and reproducing apparatus (herinafter referred simply to as the "VTR") and FIG. 1(B) shows the recording format on the tracks, respectively.

In FIG. 1(A), the VTR includes a rotary drum 1, two rotary heads 2a and 2b, and a magnetic tape 3 wound around a portion of the periphery of the rotary drum 1 by means of guide pins 4 so that the tape 3 contacts the drum 1 over an angle of 180°+α, wherein α=30°. This rotary contact area is sometimes referred to as a "wrap angle".

The audio signals to be recorded are alternatingly provided from associated recording circuitry to the rotary heads 2a, 2b. The audio signals are then recorded in the form of time-axis-compressed Pulse-Code-Modulated (PCM) audio signals SPA on tracks 5, 6, 7 obliquely formed on the tape 3 together with one-field video signals SV in respective predetermined regions of the tracks 5, 6, 7. Furthermore, a frequency-modulated audio (AFM) signal SA (constituted by a 1.5 MHz carrier wave) is recorded on the same track 5, 6, 7 with the video signal SV in a frequency share mode (i.e., frequency division multiplex mode). It is noted that numeral 8 denotes an auxiliary track located along a tape running direction and on which an audio signal (nonmodulated) is usually recorded by means of a stationary head. The AFM audio signal is recorded with the audio signal frequency modulated and interposed between frequency bands of a low-band converted chrominance signal and luminance signal of the video signal. It is noted that in FIG. 1(B), an arrow mark a denotes a scanning direction of the rotary heads 2a, 2b and an arrow mark b denotes a running direction of the tape 3. In addition, the above-described PCM audio signal SPA is usually a stereo signal comprising an L (left) channel signal and R (right) channel signal but is rarely a monaural signal comprising an (R+L) signal and the AFMm audio signal is a monaural signal.

When the above-described signal SPA is recorded, the signal SPA recorded on each track 5, 6, 7 does not correspond to the above-described video signal SV recorded on the same track and the signal SPA is recorded with a delay of substantially one field interval of time. For example, the signal SPA recorded on the track 6 substantially corresponds to the signal SV which has been recorded on the previous track 5.

When the tape 3 is recorded in the above-described format, the signal SPA is further delayed by an interval of time substantially corresponding to one track. Hence, during the playback operation, the signal SPA is outputted with a delay substantially corresponding to two field intervals (about 33.3 msec.) and the above-described AFM signal is outputted from the tape 3 at the same time as the output of the above-described signal SV.

The above-described recording and reproducing method is exemplified by a Japanese Patent Application Unexamined Open No. Sho 58-94288 published on June 4, 1983 and has been put into practice in an 8 mm VTR.

If, in the conventional reproducing apparatus having two or more channels, a stereo audio source has been recorded, a sufficient effect of expanding a sound field can be achieved when such an audible sound field expansion processing during the playback operation is carried out. However, if a monaural audio source has been recorded, the effect of expanding the sound field cannot sufficiently be achieved and only an extremely weak reproduction of the sound field can be formed.

In addition, since the conventional sound field expansion system uses delay circuits constituted by BBDs (Bucket Brigade Device) or CCDs (Charge Coupled Device), and so forth, the circuit construction thereof is complex and the cost thereof is expensive. Hence, a relatively simple reproduced sound field results.

Especially, in a case when a music sound in which a human voice(s) is incorporated is reproduced, the reproduced sound is unnatural and difficult to hear since an echo effect on the human voice is unnecessarily emphasized.

SUMMARY OF THE INVENTION

With the above-described problems in mind, it is an object of the present invention to provide a sound field expansion system which provides a sufficient effect of sound field expansion for both stereo and monaural audio signals.

It is another object of the present invention to provide the inexpensive sound field expansion system in a relatively simple construction.

It is still another object of the present invention to provide the sound field expansion system which can easily expand the sound field.

It is yet another object of the present invention to provide the sound field expansion system effectively applicable to a magnetic recording and reproducing apparatus.

The above-described objects can be achieved by providing a sound field expansion system for a magnetic recording and reproducing apparatus, comprising: (a) a first adder for adding both first and second audio signals derived from the recording and reproducing apparatus, the second audio signal being delayed by a predetermined interval of time with respect to the first audio signal; (b) a phase shift circuit for shifting the phase of the first audio signal; and (c) a second adder for adding the output signal of the phase shift circuit and the second audio signal.

BRIEF DESCRIPTION OF THE DRAWINGS

A more complete understanding of the present invention may be obtained from the following detailed description taken in conjunction with the attached drawings in which:

FIG. 2 is a simplified circuit block diagram of a sound field expansion system in a first preferred embodiment according to the present invention;

FIG. 6 is a simplified circuit block diagram of the sound field expansion system in a third preferred embodiment according to the present invention.

DETAILED DESCRIPTION OF THE PREFERRED EMBODIMENTS

Reference will hereinafter be made to the drawings in order to facilitate understanding of the present invention.

Figure 1A:
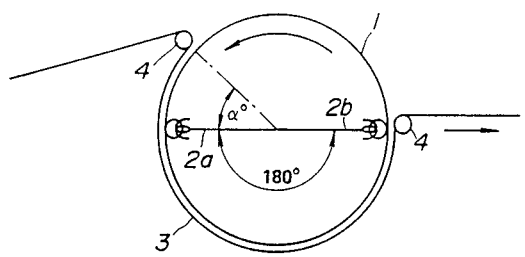
FIGS. 1(A) and 1(B) are schematic drawings of a rotary drum and a magnetic tape in a conventional video tape recorder (VTR) and of a tape record format of the conventional VTR capable of recording and reproducing the PCM audio signal and AFM audio signal.
Figure 1B:
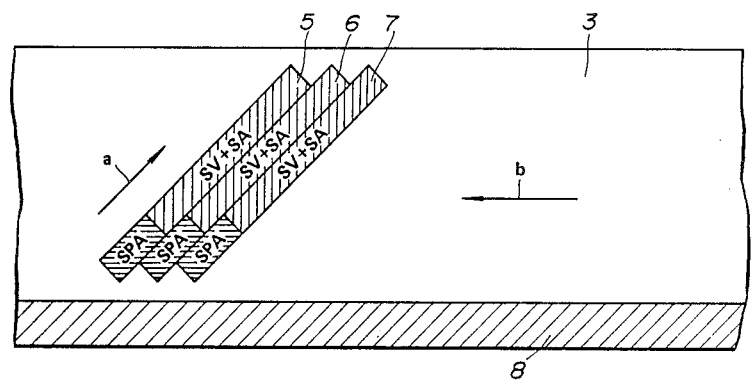

The construction and tape format of the conventional magnetic recording and reproducing apparatus (VTR) has been described with reference to FIGS. 1(A) and 1(B).

FIG. 2 shows a first preferred embodiment according to the present invention.

In FIG. 2, amplifiers 10 and 20 receive audio signals derived from demodulations of time-axis-compressed Pulse Code Modulated (PCM) audio signals SPA reproduced by, e.g., the VTR. The playback circuitry of this VTR is exemplified by a U.S. patent application, Ser. No. 884,351, filed on July 10, 1986 and a title of which is "HELICAL-SCAN-TYPE VIDEO TAPE RECORDER". The above-identified U.S. patent application corresponds to EPC patent application No. 86,305,485.4 and is hereby incorporated by reference.

In the first preferred embodiment, the signal SPA is monaural and, hence, the signal (L+R) is sent to the above-described respective amplifiers 10, 20. It should be noted that R (Right stereo) signal or L (Left stereo) signal may alternatively be sent to the respective amplifiers 10, 20, i.e., the R signal is sent to the lower amplifier 20 and the L signal is sent to the upper amplifier 10, rather than the signals (L+R).

The amplified output signals of the amplifiers 10, 20 are then sent to adders 30, 40, respectively.

On the other hand, an amplifier 50 receives an audio signal SA derived from the demodulation of a reproduced AFM (Audio Frequency Modulated) signal.

It should be noted that the above-described (L+R) signal is delayed by about 33.3 milliseconds (msec.) with respect to the signal SA. The output signal level of the above-described amplifier 50 is adjusted by means of an attenuator 60 and, thereafter, is sent to a filter 70.

Figure 3:
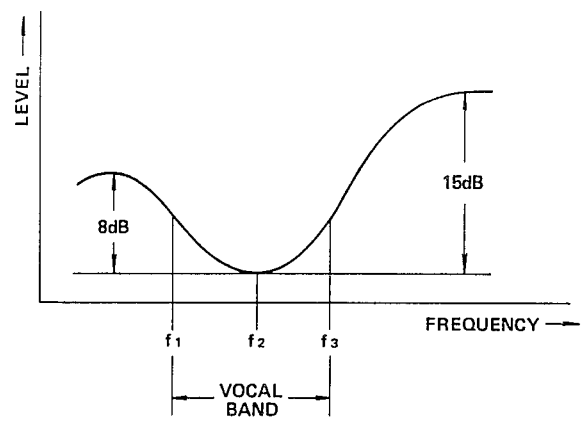
FIG. 3 is a characteristic graph of a filter 70 shown in FIG. 2.

The filter 70 has a frequency characteristic such that the output level thereof is reduced at a human's voice frequency band ranging from $f_1$ to $f_3$ as appreciated from FIG. 3. In FIG. 3, for example, $f_1$ denotes 500 Hz, $f_2$ denotes 1 KHz, and $f_3$ denotes 2 KHz.

The output signal phase of the filter 70 is then shifted by a predetermined quantity by means of a phase shift circuit 80, i.e., in this embodiment, signal phase is inverted by means of an inverting amplifier 80 and thereafter added to the output signal (L+R) of the amplifier 10 by means of an adder 30. The addition output signal is sent to an L channel speaker 100 via a power amplifier 90. Furthermore, the output signal of the filter 70 is directly sent to an adder 40 in which the output signal thereof is added to the output signal (L+R) of the amplifier 20. The output signal of the adder 40 is sent to an R channel speaker 120 via a power amplifier 110.

Figure 4:
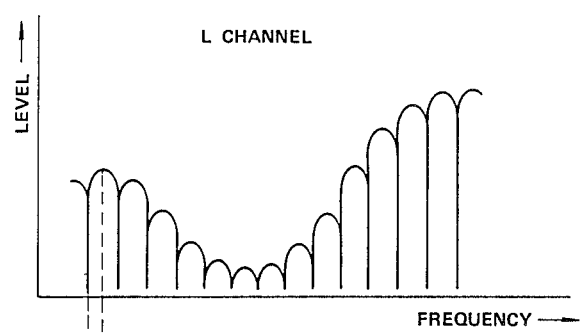
FIGS. 4(A) and 4(B) are characteristic graphs of a comb filter formed in the circuitry shown in FIG. 2.
Figure 4:
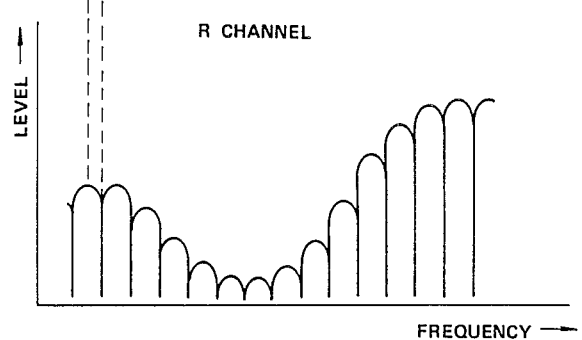

When the signal SA is added to the signal (L+R) delayed by about 33.3 msec. with respect to the signal SA, two comb filters having characteristics as shown in FIGS. 4(A) and 4(B) are virtually formed by the two adders 30, 40, respectively. Since, in this case, a phase inverted signal SA by the inverting amplifier 80 is added to the signal (L+R) at the L-channel side, the comb filter characteristic at the L-channel side has peaks and cups which are inverted with respect to that at the R-channel side, as shown in FIGS. 4(A) and 4(B). In addition, the output signal levels of these virtual comb filters are reduced, (i.e., remarkable comb filter characteristics do not appear) at the vocal frequency bands $f_1$ through $f_3$ due to an influence of the filter characteristic of the filter 70 shown FIG. 3.

In the embodied circuit shown in FIG. 2 and having the characteristics shown in FIGS. 4(A) and 4(B), an acoustic image is formed by means of left and right L-channel, R-channel speakers 100, 120. The acoustic image is moved from a right position to a left position as heard by a listener and vice versa according to the frequencies of the input signals (L+R) and SA up to the frequency $f_1$ from a lower frequency. In addition, the acoustic image is almost positioned to a center of the sound field with respect to the two speakers 100, 120 in the frequency band of $f_1$ through $f_3$. Furthermore, the acoustic image is moved again from the left position to the right position and vice versa at higher frequencies than $f_3$ when the frequencies of the input signals (L+R) and SA are increased together from their lowest.

Hence, an infinite number of acoustic images are scattered over a wide space surrounding the left and right speakers 100, 120 according to the frequency difference and phase difference between the L and R channels and are freely moved or oriented. Such an effect as described above permits a very wide and deep sound field to be provided from the two speakers 100, 120 even though the sound source is monaural. In addition, an acoustic image such as a human's singing voice is substantially oriented to the center.

Figure 5:
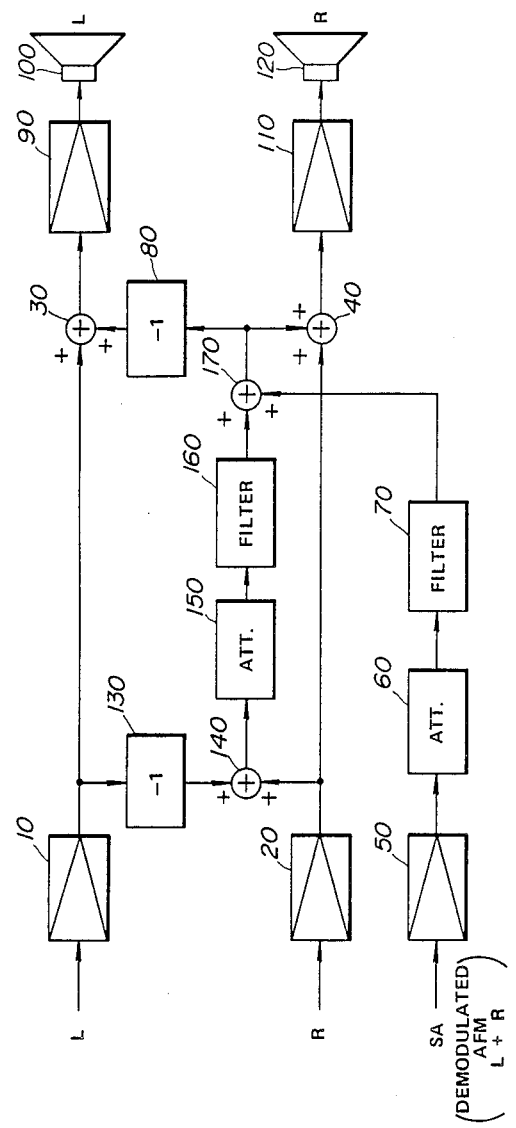
FIG. 5 is a simplified circuit block diagram of the sound field expansion system in a second preferred embodiment according to the present invention.

FIG. 5 shows a second preferred embodiment according to the present invention, in which the same reference numerals as those shown in FIG. 2 designate corresponding elements.

In this drawing, the amplifiers 10, 20 receive the stereo signals L, R demodulated from the abovedescribed signal SPA.

An adder 140 adds a signal derived from the phase inversion of the signal outputted from the amplifier 10 through the inverting amplifier 130 and the signal R outputted from the amplifier 20. After a suitable correction of the added output signal is carried out by means of the attenuator 150 and filter 160, the corrected addition signal of the filter 160 is further added to an output signal of the filter 70 in the adder 170. The addition output signal derived from the adder 170 is then sent to the inverting amplifier 80 and adder 40.

The adder 140 provides a signal according to a level difference between the signals L and R since the inverting amplifier 130 is interposed between the amplifier 10 and adder 140. Hence, since the two comb filter characteristics are provided at the two adders 30, 40 due to the addition of the signal according to the level differences between the signals L and R derived through the filter 160 to the output signal of the filter 70, an effect is achieved that frequency components of the signal provided according to the level difference between the R and L signals are more remarkably emphasized. This effect further emphasization of the orientation of the acoustic image such that the acoustic images are oriented more leftward when they are moved to the left position and, in turn, oriented more rightward when they are moved to the right position.

FIG. 6 shows a third preferred embodiment according to the present invention, in which the same reference numerals as those shown in FIG. 2 designate corresponding elements.

As shown in FIG. 6, the amplifier 20 shown in FIG. 2 is omitted in this embodiment and the output signal of the amplifier 10 is directly sent to the adder 40.

The third preferred embodiment achieves a pseudo stereo effect of expanding a sound field.

It should be noted that in each preferred embodiment shown in FIG. 2, FIG. 5, and FIG. 6, any one of the signals (L+R), R, and L may arbitrarily be inputted to either or both of the amplifiers 10, 20. In addition, the phase shift circuit which can adjust the magnitude of the phase shift of the input signal (L+R), R, or L may alternatively be used in place of each or either of the inverting amplifiers 80, 130. The filter 70 may be installed at each output side of either or both of the amplifiers 10, 20. Furthermore, an acoustic image having a desired frequency can be positioned by selecting various characteristics of filters 70, 160. It is noted that the AFM signal may be recorded on the auxiliary track 8 running in the lateral direction of the tape 3, e.g. shown in FIG. 1(B). In the way described above, a variety of effects of expanding the sound field can be produced.

Since the sound field expansion system according to the present invention which is applicable to the VTR can utilize effectively the time delay of the signal SPA, the expansion of the sound field can easily be put into practice without any change in the conventional tape format of the VTR and specifications in the magnetic recording and reproducing apparatus and without use of delay circuit elements such as BBD, CCD, and so on. In addition, since an acoustic image can be formed over a wider space than the conventional system, and a wide and deep sound field space can be achieved even though the sound source is monaural. Furthermore, if the characteristics of the filters 70, 160 are; selected arbitrarily, such an effect that the acoustic image having a desired frequency band is positioned to, e.g., the center.

It will clearly be understood by those skilled in the art that the foregoing description is made in terms of preferred embodiments and various changes and modifications may be made without departing from the scope of the present invention which is to be defined by the appended claims.

What is claimed is:

1. A sound field expansion system for a magnetic recording and reproducing apparatus, comprising:
   (a) a first adder for adding both first and second audio signals derived from the recording and reproducing apparatus, the second audio signal being delayed by a predetermined interval of time with respect to the first audio signal, the second audio signal being derived from a pulse-code-modulated time-axis-compressed audio signal recorded on a common track of a magnetic tape with a one-field video signal in a time share mode and the first audio signal being derived from a demodulation of an audio frequency-modulated signal recorded on the common track with the one-field video signal in a frequency division multiplex mode, an output of said first adder providing a first sound output of said system;
   (b) a phase shift circuit for shifting the phase of the first audio signal; and
   (c) a second adder for adding the output signal of the phase shift circuit and the second audio signal, an output of said second adder providing a second sound output of said system so that the reproduced sound field of said first and second said sound outputs is expanded.

2. The sound field expansion system according to claim 1, which further comprises a correction circuit for providing a predetermined frequency characteristic for the first audio signal before the first audio signal is sent to the first adder and to the phase shift circuit.

3. The sound field expansion system according to claim 2, wherein the correction circuit comprises a filter having the predetermined frequency characteristic such that the output signal level thereof is reduced in a frequency band of a human voice.

4. The sound field expansion system according to claim 2, wherein both first and second audio signals are monaural.

5. The sound field expansion system according to claim 4, which further comprises a speaker circuit for producing a sound field on the basis of both output sound signals of the first and second adders, wherein the speaker circuit includes an L-channel speaker and R-channel speaker, and wherein the first adder receives a monaural second audio signal and the monaural first audio signal and sends the output signal to the R-channel speaker and the second adder receives the other monaural second audio signal and the monaural first audio signal passed through the phase shift circuit and sends the output signal to the L-channel speaker.

6. The sound field expansion system according to claim 2, wherein the first audio signal is monaural and wherein the second audio signal is stereophonic and comprises an L-channel second audio signal and a R-channel second audio signal.

7. The sound field expansion system according to claim 6, which further comprises a speaker circuit which produces a sound field on the basis of both output signals of the first and second adders and which includes a L-channel speaker and R-channel speaker, and which further comprises: another phase shift circuit which shifts the phase of the L-channel second audio signal; a third adder for adding the L-channel second audio signal passed through the other phase shift circuit and the R-channel second audio signal; another correction circuit for providing another predetermined frequency characteristic for the output signal from the third adder; a fourth adder for adding the output signal from the other correction circuit and output signal of the correction circuit, wherein the first adder receives the output signals from the fourth adder and from the R-channel second audio signal and sends the output signal thereof to the R-channel speaker, and wherein the second adder receives the L-channel second audio signal and the output signal of the phase shift circuit and sends the output signal thereof to the L-channel speaker.

8. The sound field expansion system according to claim 7, wherein the two phase shift circuits are both inverting amplifiers.

9. The sound field expansion system according to claim 7, wherein both predetermined frequency characteristics of the two correction circuits are selected arbitrarily.

10. The sound field expansion system according to claim 9, wherein both predetermined characteristics of the two correction circuits are such that output signal levels thereof are reduced at arbitrarily selected frequency bands.

11. The sound field expansion system according to claim 7, wherein magnitudes of phase shifts of the two phase shift circuits are adjustable.

12. A sound field expansion system, comprising:
(a) a first adder for adding both first and second audio signals derived from a recording and reproducing apparatus, the second audio signal being delayed by a predetermined interval of time with respect to the first audio signal, the first adder providing a two-channel comb filter characteristic to said added first and second audio signals;
(b) a phase shift circuit for shifting the phase of the first audio signal, the phase shift circuit being constituted by an inverting amplifier; and
(c) a second adder for adding the output signal of the phase shift circuit and the second audio signal.

13. A sound field expansion system for a magnetic recording and reproducing apparatus of the type which produces, upon play back, at least a first audio signal (SPA) by demodulating a time-axis-compressed pulse code modulated (PCM) audio signals and a second audio signal (SA) by demodulating an audio frequency modulated (AFM) signal recorded on a magnetic medium, wherein said first audio signal is delayed in time relative to said second audio signal, comprising:
a first adder having first and second inputs, a first input thereof receiving a signal representative of said first audio signal;

means for providing a predetermined frequency characteristic to said second audio signal (SA), including filter means, to provide a corrected second audio signal (SA) at the output thereof;
a phase shift circuit for shifting the phase of said corrected second audio signal to provide at least a phase shifted corrected second audio signal (SA) to a second input of said first adder to provide a first sound output signal therefrom representing the addition of said first audio signal and said phase-shifted corrected second audio signal; and
a second adder circuit having first and second inputs for receiving a signal representative of said first audio signal at a first input thereof and a signal representative of said corrected second audio signal at a second input thereof to provide a second sound output signal therefrom;
whereby a sound field represented by said first and second sound output signals for said first and second adders is expanded as heard by a listener.

14. The sound field expansion system as set forth in claim 13, wherein said first audio signal contains a first component and a second component, a signal representative of said first component being provided to a first input of said first adder, and a signal representative of said second component being provided to said second adder, said second signal being delayed relative to said first signal by an amount determined according to their respective recording locations on said magnetic medium.

15. The sound field expansion system as set forth in claim 14, further including a second phase-shift circuit for shifting a phase of a signal representative of said first audio signal to provide a phase-shifted output representative thereof;
a second adder having a first input fo receiving said phase-shifted output signal from said second phase-shift circuit;
said second input of said second adder receiving a signal representative of a second component of said first audio signal to provide a combined output from said second adder;
means for correcting the output from said second adder, including filter means, to provide a corrected output signal therefrom;
a fourth adder for receiving said corrected second audio signal and providing a combined output signal thereof to said first phase-shifter and to an input of said second adder.

16. The sound field expansion system as set forth in claim 15, wherein said first audio signal is monaural.

17. The sound field expansion system as set forth in claim 15, wherein said first audio signal is stereo, or monaural, wherein said first component and said second component are combined signals, in the case of a monaural audio signal, and, in the case of a stereo audio signal said first component is a first-channel signal of said stereo audio signal while said second component is a second channel signal for said stereo audio signal.

* * * * *